United States Patent [19]
Brockett et al.

[11] 3,894,168
[45] July 8, 1975

[54] PAPER COATING PIGMENT MATERIAL

[75] Inventors: Bruce W. Brockett; Robert E. Miller, both of Dayton, Ohio

[73] Assignee: NCR Corporation, Dayton, Ohio

[22] Filed: Apr. 30, 1971

[21] Appl. No.: 139,118

[52] U.S. Cl. ............... 428/514; 427/150; 428/537; 428/538; 106/308 Q
[51] Int. Cl.² ......................................... B41M 5/12
[58] Field of Search.............. 117/36.2, 36.8, 36.9; 106/308 Q; 428/514, 537, 538; 427/150

[56] References Cited
UNITED STATES PATENTS

| | | |
|---|---|---|
| 2,809,122 | 10/1957 | Willis et al..................... 106/308 Q |
| 3,107,174 | 10/1963 | Wartman.......................... 117/36.2 |
| 3,389,007 | 6/1968 | Oda et al........................ 117/36.2 |
| 3,491,111 | 1/1970 | Lin................................. 117/36.2 |

*Primary Examiner*—Michael Sofocleous
*Attorney, Agent, or Firm*—E. Frank McKinney; Robert J. Shafer

[57] ABSTRACT

A free-flowing powder of pigment particles having basereacting, chromogenic, colorless, dye-precursor material adsorbed thereon, and a novel pressure-sensitive record sheet material, utilizing said adsorptively-coated pigment material together with a source of colorless liquid ink which produces a color when and where applied to the dye-precursor-coated pigment particles.

21 Claims, 1 Drawing Figure

3,894,168
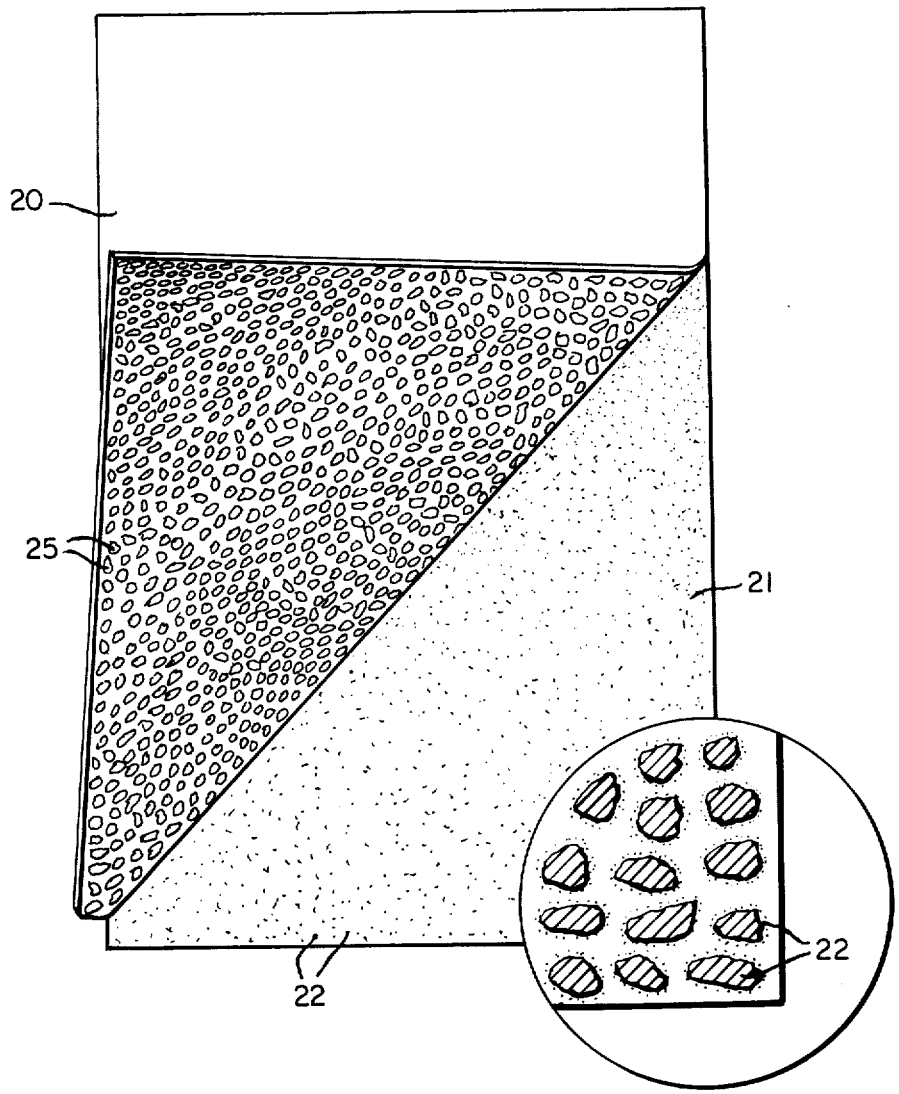
INVENTOR
BRUCE W. BROCKETT
ROBERT E. MILLER
BY
THEIR ATTORNEY & AGENT 3,894,168

PAPER COATING PIGMENT MATERIAL

The invention provides a novel pressure-sensitive record material system of one or more sheets suitable for accepting printing or writing, consisting of a base paper web, preferably of light hue or white reflectance, which has distributively coated thereon, with a minimum amount of binder, light hued or white-light-reflecting, chemically neutral, pigment particles or other paper-coating mineral particles of microscopic size, each of which has adsorbed thereon a colorless dye-precursor material of chemically basic reactivity, which adsorptive adherence renders the precursor stable against the degrading influence of environmental agencies, particularly that of incident light, and thus helps in maintaining the precursor's reactivity and which precursor coating will, without appreciable delay, produce a distinctly-colored, persistent mark where touched with a colorless liquid comprising an acidic material dissolved in a solvent which is also a solvent for the precursor.

Because the coating slurry of dye-precursor-sensitized pigment in a medium such as water of itself is unique both the coated pigment particles and the aqueous slurry thereof apart from the paper coated therewith are claimed separately as a significant part of the invention.

In a complete record material system, the acidic material may be acidic polymeric material, supplied from any inker such as an inked type, a typewriter ribbon, a liquid ink droplet-holding dried film emulsion rupturable by a writing instrument or a coating of liquid-droplet-containing, pressure-rupturable microcapsules on an overlying sheet as described in U.S. Pat. No. 2,712,507 which issued on an application of Barrett K. Green on July 5, 1955, or on the same sheet as disclosed in U.S. Pat. No. 2,730,457 and in some improvement patents to be mentioned hereafter.

This invention as embodied in a two-sheet system has a resemblance to a system portrayed in FIG. 2 of the application of Robert E. Miller and Paul S. Phillips, Jr., Ser. No. 44,805, filed June 4, 1970, now U.S. Pat. No. 3,672,935 because FIG. 2 (II, IIa, VI, X) of that patent shows an undersheet, having distributed in or on it particles of dry, colorless dye-precursor, and superimposed thereon, another sheet, carrying a plurality of microcapsules, each holding a droplet of liquid, acid, polymeric-material solution which is a developer for the dye-precursor. But such system fails to meet an important feature of novelty of the invention of this claimed system and that feature is the fact that the dry, dye-precursor material of the undersheet of this invention is adsorbed on neutral pigment particles. Beyond the function of the pigment particles as affording a large surface area on which a small amount of the dye-precursor can be spread as a dried residue of a liquid solution to produce more visible color per unit area of dried coating, when its color is developed, the dye-precursor's being adsorbed on the pigment renders it stabilized against both premature deterioration and premature coloration--so the sheet remains uncolored by the dye-precursor but nevertheless is ready for instant and stable color-response in the planned manner. The colorless dye-precursor distributed as a dried solution residue on paper fibers of an ordinary paper sheet is not stable and variously becomes inert or prematurely colored according to ambient conditions.

An unexpected benefit of the system wherein an acid-reactant liquid ink is applied from an external source or from in situ droplets is that it economically permits of the saving of more than 30 percent of the amount of colorless dye precursor necessary to yield the same standard excellence of performance as now obtained by the nearest competition system known as "NCR Paper" wherein the dye-precursor is held as solution droplets in capsules. The reason for this savings is that because the dye-precursor is located as isolated droplets of liquid in the oversheet of the heretofore known "NCR Paper" system from which it must move to the undersheet, it is never completely transferred to the undersheet surface to be colored, a transfer of 40–50 percent of the droplet volume released being deemed good in known systems.

This failure of transfer of the liquid solution of dye-precursor from an oversheet to an undersheet, by pressure writing or printing, partly is caused by capillary retention of the liquid on the ruptured walls of the confining, isolating film (capsule or cell walls) and in addition its loss into the backing substrate by absorption. In the instant system, no such loss of dye-precursor material by failure to transfer can occur as no dye-precursor transfer is involved. That is to say, the commercial art teaches transfer record materials wherein expensive dye-precursor material is protectively stored as a liquid for later transfer to a cheap acidic developer material which is stable to environmental agents even when finely-divided on a paper surface. In the known art sheets, the instability of the dye-precursor material to light and other environmental agents dictated the choice of incorporating it on the more protected back-side of transfer sheets and transferring it as a liquid to the acid material on receiving sheets, with the attendant loss of at least half of the more-expensive material at the time of transfer. Now the instant invention gives the artisan, in effect, a dry, free-flowing dye-precursor-material powder which is stable to environmental agents and can be coated on the unprotected face of a sheet of paper to later receive the cheap acid developer by the necessarily wasteful and inefficient liquid transfer step.

GENERAL DESCRIPTION

The drawing illustrates the several aspects of the invention as integrated into a two sheet record form consisting of an oversheet 20 coated on the rear surface with liquid ink droplets indicated at 25 which may be retained isolated in a matrix of dried film-forming polymeric material such as a dried emulsion of colorless, liquid-ink droplets dispersed in a liquid solution of a natural polymeric material as disclosed in U.S. Pat. No. 2,374,862, which issued on May 1, 1945 on the application of Barrett K. Green wherein the colorless basic reactant tetra-methyldiamino-diphenyl-phthalide in a vehicle of paraffin oil and chlorinated diphenyl is disclosed as emulsified in a water solution of gelatin and coated on paper to yield a colorless reactant ink when impressed with a writing or printing instrument or wherein the droplets 25 are enclosed in polymer walls of minute pressure-rupturable capsules as disclosed in U.S. Pat. No. 2,712,507 which issued July 5, 1955 on the application of Barrett K. Green wherein the capsule walls are disclosed as gelatin and the colorless ink as an oil solution of Crystal Violet Lactone which is a colorless basic reactant turning dark blue when reacted with an acidic reactant whether a liquid reactant as p-phenylphenol-formaldehyde polymer in solution or as adsorbed on a solid surface reactant such as attapulgite, which latter acts as an acid. The droplets may be held isolated for pressure release in any other kind of isolation matrix material such as a woven fabric or equivalent wherefrom it may be transferred to the undersheet 21 there to make a mark by contact with a colorless adsorbed co-reactant spread over neutral pigment particles 22 (see the enlarged view of such pigment particles in the circle wherein the basic, colorless, reactant material adsorbed is shown as sattelite dots around each particle).

The system of two sheets may be multiplied into a stack of a number limited only by the ability of the impression means and the sensitized sheets to respond in sufficient definition and wherein the intermediate sheets of a stack bear a top coating of particles 22 and a back coating of droplets 25 and wherein the first sheet of a stack needs only the back coating and the bottom sheet of a stack needs only the top coating.

In still another form of the invention the isolated droplets of colorless ink may be distributed among the particles of sensitized pigment bearing the adsorbed colorless co-reactant to make an autogenous or "self-contained" sheet system with but one substrate sheet on which a mark may be made without an outside ink source. Since a self-contained sheet system has long been known it is not necessary to even make a token illustration of it, but a workable method of making it will be disclosed.

The dye-precursor-coated pigment particles of this invention are preferably coated onto paper sheets, together with paper-coating binder material, but equivalent sensitized record sheet material may also be obtained by other methods of application such as including the dye-precursor-coated pigment particles among the paper fibers during the manufacture of a paper record sheet. Materials other than paper, such as plastic sheeting, may also be coated with the dye-precursor-coated pigment particles of this invention to give a sensitized record material, but fibrous sheets, particularly paper sheets are preferred.

The stability of the adsorbate precursor on the pigment while in the colorless state and also in the reacted colored state, after meeting with a liquid material of the necessary acidity, is improved by a distinctly measurable and economically desirable amount. The stability of any record data depends largely on resistance to light exposure, early fading being an intolerable defect. Shelf life of the claimed record material in the unused state and in the used condition is enhanced by the use of the teaching of this invention.

Stability of the dye either in colorless or colored form is a significant factor in the success of the total system. By having the released "ink" in an evaporable solvent, early dryness of the recorded matter is assured and dryness of the colored material greatly increases its stability and also gives a non-bleeding print. The ink applicator, in the preferred example, is an oversheet coated with minute colorless inkretaining capsules and the ink in the capsules is qualified by being an acidic, reactant, phenolic, polymeric material dissolved in an evaporable solvent which dries quickly to leave the stable reaction product (which is the colored form of the dye in dry state on the pigment). Preferred capsule walls for retaining such quick-drying "ink" are disclosed in U.S. patent application Ser. No. 701,124, filed Jan. 29, 1968 by Robert G. Bayless and Donald D. Emrick and now abandoned. This subject matter has issued as British Pat. No. 1,190,720 dating from May 6, 1970. These specialized capsules are particularly adapted to the retention of liquid solvents with a high vapor pressure and small molecular size under room environment and are specified because of that property.

The capsule walls specified in the Bayless-Emrick invention are rendered substantially impenetrable to solvent vapors by having the pores therein occupied by new polymer material literally grown-in-situ from reactant penetrants which materialize as newly-formed completed polymer material. This is in effect making capsules formerly having solvent vapor-penetrable walls sealed against the passage of such vapors. This system enables the retention of any such vapors and prevents premature colorations on any of the coated pigments which may be within vapor diffusion range in a given coating system made of capsules not so-sealed against vapor diffusion.

EXAMPLE 1

Dye-precursor-coated neutral pigment particles.

Three grams of colorless dye-precursor was dissolved in 200 grams of acetone, and the solution was blended with 200 grams of neutral pigment in a Waring "Blendor" for 5 minutes. The resulting dispersion was allowed to air dry with occasional stirring to give a dry free-flowing powder of colorless to lightly-colored dye-precursor-coated pigment.

Typical dye-precursors used in this procedure were Crystal Violet Lactone (called CVL), 3,3-bis-(1-ethyl-2-methylindol-3-yl)phthalide, 6'-chloro-8'-methoxybenzoindolinopyrylospiran, N-(2,5-dichlorophenyl)leucauramine, N-phenylauramine, di-4,4'-[(diethylamino) phenyl]ketone, Vermillion (3-chloro-6-diethylamino-2-methylfluoran disclosed in U.S. Pat. No. 3,442,908), Pink (6-diethylamino-1,2-benzofluoran), N-102 (2'-anilino-6'-diethylamino-3'-methylfluoran) disclosed and claimed in U.S. application No. 90,097, filed Nov. 16, 1970, now U.S. Pat. No. 3,681,390 and mixtures of two or more such dye-precursors.

Typical water-insoluble, substantially neutral pigments used in this procedure were calcium carbonate, zinc oxide, barium sulfate, titanium oxide, barium carbonate, magnesium carbonate, calcium oxide, magnesium titanate, and zinc sulfide. A particularly effective and useful mixture of neutral pigment particles for use in this procedure consisted of 95 weight percent of calcium carbonate and 5 weight percent of zinc oxide.

The only requirements for pigment particles to be useful herein are that they be water-insoluble and approximately chemically neutral, slight basicity being more readily tolerable than slight acidity, because acidic pigments tend to develop the color of the dye-precursor materials before use. Some of the eligible pigments listed above absorb ultraviolet light in the range of about 230 to about 380 millimicrons and others reflect it in this range. Calcium carbonate, which shows a degree of ultraviolet light absorbance, intermediate among the pigments named above, is preferred for general use because it is quite effective at stabilizing base-reacting dye-precursor materials against environmentally induced decomposition and is both cheap and readily handled in the papercoating art. Zinc oxide which shows a high degree of ultraviolet light absorption (and therefore a low degree of ultraviolet light reflectance) is the most effective pigment found herein for the stabilization of adsorptively coated base-reacting dye-precursor materials. The addition of a little zinc oxide to any of the other neutral pigments serves to improve the stability of the dye-precursor materials coated thereon. The preferred coated pigment material is a mixture of a preponderance of calcium carbonate with zinc oxide having a base-reacting chromogenic material coated thereon as described. Particularly effective, cheap and readily handled is a dye-precursor-coated mixture of about 90 to 95 weight percent calcium carbonate and about 5 to 10 weight percent zinc oxide.

The method of application of the dye-precursor material to the neutral mineral particles is immaterial to this invention--the only requirement being that the dye-precursor be adsorbed in a colorless state on the mineral particles. Other methods which are useful include passing a solution of the dye-precursor through a bed of the mineral particles as in chromatographic processes and precipitation of the colorless dye-precursor from solution in the presence of the mineral particles by any of the many precipitation-inducing methods known in the chemical arts, including dilution of the dye-precursor solution with a solution-miscible non-solvent for the dye-precursor, chemical neutralization of an acidic aqueous solution of the dye, and cooling a hot solution of dye-precursor.

Another method of making a dye-precursor-coated pigment particle, a CVL-coated pigment particle for instance, is to vigorously machine-grind dry solid CVL particles together with pigment particles that are harder than the CVL particles so that the shearing contact will effectively "smear" CVL on the pigment particles. This method is inefficient and wasteful of CVL, but can be used to give a decline-resistant particle coat. Coats having CVL-coated pigment particles that are made by the described grinding process are not preferred because of the beforementioned inefficiency and also because they show less than optimum print speed.

EXAMPLE 2

Paper-coating slurry of dye-precursor-coated pigment.

The dye-precursor-coated pigment from about (203 grams) was dispersed in water with 20.0 grams of 35 percent (aqueous) sodium silicate in a Waring "Blendor." To this dispersion was added 200 grams of 5 percent aqueous poly(vinyl alcohol) solution. Other binder materials such as starch or paper-coating latexes can be added in addition to poly(vinyl alcohol) or in place of it, although the inclusion of some poly(vinyl alcohol) is preferred because it eliminates any light color that the coated pigment may have due to partial development of dye color at the time of the coated pigment formation. The coating slurry, formulated as above, was diluted with water to give a total solids concentration of about 30 percent.

The dye-precursor-coated pigment powder may, of course, be diluted with inert paper-coating pigments, bearing no dye-precursor adsorbate, either before or after addition to the aqueous paper-coating slurry.

EXAMPLE 3

Paper sheets coated with dye-precursor-coated pigment particles.

The above paper-coating slurry was coated on 33 pound bond paper with a No. 7 Mayer rod. After drying, the coating weight was about 3 pounds per ream of 500 sheets, measuring 25 by 38 inches. The preferred coated sheets were those coated with calcium carbonate pigment particles bearing an adsorbed coating of Crystal Violet Lactone (CVL). The two main concerns of CVL-stability on a paper sheet, aside from premature coloration which has not been a problem in commercial practice nor in the sheets of this invention are:

1. fading of the developed dye print after use (dye deterioration) and
2. decline in sensitivity and potential intensity of the sheet before use (dye-precursor deterioration).

The sheets described herein improve the stability of both the CVL dye-precursor and developed CVL dye compared to the commercial system. That is to say, CVL dye-precursor adsorbed on a neutral pigment such as zinc oxide is more stable toward light and environmental agents (decline resistant) than is a gelatin-encapsulated solution of CVL dye-precursor in 2:1 "Aroclor 1242"—"Magnaflux Oil". After use, the developed CVL dye color is more stable and fade-resistant when developed by the phenolic resin marking liquid described above applied to CVL-coated zinc oxide particles than is the commercial system where a 2:1 "Aroclor 1242"—"Magnaflux Oil" solution of CVL is applied to a kaolin-phenolic resin sheet.

EXAMPLE 4

Alternate method of manufacture of CVL-pigment coated sheet.

A coating slurry of zinc oxide, sodium silicate and poly(vinyl alcohol) was made according to Example 2, with uncoated zinc oxide substituted for the dye-precursor-coated neutral pigment particles of that Example, and coated onto bond paper sheets with a No. 10 Mayer rod to give a drycoat weight of about 5 pounds per specified ream. The coated sheets were calendered and printed with a 5 percent solution of Crystal Violet Lactone in xylene with an offset gravure printer using a 165-etch gravure roll. The resulting coated sheet performed in use similarly to the coated sheet of Example 3 and is regarded as a sheet coated with dye-precursor-coated neutral pigment particles differing from the sheet of Example 3 in that the dye-precursor coating was applied to the neutral pigment particles after, instead of before, the pigment particles were coated on the paper substrate. This latter procedure readily allows spot printing with different dye-precursor solutions to give a sensitized coated sheet capable of producing different colors in different areas in response to colorless, acidic, liquid inks.

EXAMPLE 5

Preferred encapsulated acidic marking liquid.

Several different oil-soluble phenolic resins of the para-substituted novolak type were dissolved in various oils (xylene, perchloroethylene, and polychlorinated biphenyl (which is "Arochlor –242") as 2:1 parts by weight mixture with "Magnaflux Oil," a high-boiling kerosene cut) and encapsulated with gelatin wall material or resorcinol-formaldehyde filled poly(vinyl alcohol) wall material. The preferred capsules for use in this system consisted of a 17 percent solution of para-phenylphenol-formaldehyde resin in xylene encapsulated with poly(vinyl alcohol) polymer film material which was made impervious by in situ treatment with resorcinol and formaldehyde as taught in the previously cited application of Robert G. Bayless and Donald D. Emrick. The preferred capsules (38 grams) were mixed with 16 grams of short alpha-cellulose floc fibers as capsule protectant material, 120 grams of 5 percent aqueous poly(vinyl alcohol), "Elvanol 71–30", as binder material and 112 grams of water to give a capsular coating slurry which was coated on bond paper with a No. 18 Mayer rod to give a dry-coat weight of 4.5 pounds per specified ream. Acid-containing capsules and dye-precursor-coated neutral pigment particles were coated on separate sheets for use as transfer sheet and receiving sheet pairs, on the same side of the same sheet to give "self-contained" record material, and on opposite sides of the same sheet to give intermediate manifold sheets which are known as CFB sheets in the trade. The self-contained sheets were made by separate coatings of the two slurries (capsules and coated-pigment slurries) in either order or by mixing the capsules and coated pigment particles together in a slurry and coating sheets in a single pass.

What is claimed is:

1. A minute particle of water-insoluble, chemically neutral paper-coating, pigment substance that has adsorbed thereon a water-insoluble, chromogenic, substantially-colorless dye-precursor of basic chemical reactivity, said dye-precursor being stabilized against deterioration by incident light because of being in such adsorbed state.

2. The minute particle of claim 1, wherein the pigment substance is calcium carbonate and the dye-precursor is Crystal Violet Lactone.

3. A dry, free-flowing, powder comprising particulate material consisting of water-insoluble, chemically neutral, paper-coating pigment particles a substantial portion of which have adsorbed thereon an acid-colorable, water-insoluble, chromogenic, substantially colorless dye-precursor material.

4. The powder of claim 3 wherein the pigment particles are at least in part calcium carbonate particles.

5. The powder of claim 3 wherein the dye-precursor material includes Crystal Violet Lactone.

6. The powder of claim 4 wherein the dye-precursor material includes Crystal Violet Lactone.

7. The powder of claim 3 wherein at least part of the pigment particles having dye-precursor material adsorbed thereon are ultraviolet-light-absorbing pigment particles.

8. The powder of claim 7 wherein the ultraviolet-light-absorbing pigment particles are zinc oxide particles.

9. The powder of claim 7 wherein the ultraviolet-light-absorbing pigment particles are titanium dioxide particles.

10. The powder of claim 3 wherein the pigment particles having dye-precursor material adsorbed thereon are a mixture of calcium carbonate and zinc oxide.

11. The powder of claim 10 wherein the pigment particle mixture is at least about 90 weight percent calcium carbonate.

12. The powder of claim 11, wherein the dye-precursor material is Crystal Violet Lactone.

13. A record sheet having a base web coated with water-insoluble, chemically neutral, paper-coating, mineral particles of minute size at least part of the particles having adsorbed thereon a water-insoluble, chromogenic, substantially colorless basic dye-precursor.

14. The record sheet of claim 13 wherein the mineral material is calcium carbonate.

15. The record sheet of claim 13 wherein the mineral material is a mixture of calcium carbonate and zinc oxide.

16. The record sheet of claim 14 wherein the dye-precursor material is Crystal Violet Lactone.

17. A paper-coating slurry comprising water, binder material and minute water-insoluble, chemically neutral, paper-coating particles of mineral, having adsorbed thereon a water-insoluble, chromogenic, substantially colorless basic dye-precursor, the particles being chemically inert to the dye-precursor.

18. The paper-coating slurry of claim 17 wherein the binder material includes poly(vinyl alcohol).

19. The paper coating slurry of claim 18 wherein the mineral comprises calcium carbonate and the dye-precursor is Crystal Violet Lactone.

20. A record sheet material comprising a transfer sheet superimposed on a receiving sheet wherein said transfer sheet comprises isolated liquid droplets of acidic material and said receiving sheet comprises a base web coated with, water-insoluble, chemically neutral, mineral particles of minute size, at least part of the particles having adsorbed thereon a water-insoluble, chromogenic, substantially colorless, basic, dye-precursor, said dye-precursor having the property of changing to a distinctive hue when and where touched by acidic liquid which is a solvent for said dye-precursor.

21. A record sheet material comprising a base web including isolated liquid droplets of acidic material and, water-insoluble, chemically neutral, mineral particles of minute size, at least part of the particles having adsorbed thereon a water-insoluble, chromogenic, substantially colorless basic dye-precursor, said dye-precursor having the property of changing to a distinctive hue when and where touched by acidic liquid which is a solvent for said dye-precursor.

* * * * *